US012271017B1

(12) United States Patent
Lu et al.

(10) Patent No.: US 12,271,017 B1
(45) Date of Patent: Apr. 8, 2025

(54) KEY STRUCTURE

(71) Applicant: Acer Incorporated, New Taipei (TW)

(72) Inventors: Ching-Yi Lu, New Taipei (TW);
Ming-Cheng Wu, New Taipei (TW);
Yi-Heng Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/796,280

(22) Filed: Aug. 6, 2024

(30) Foreign Application Priority Data

Oct. 4, 2023  (TW) .................................. 112138162

(51) Int. Cl.
*F21V 8/00* (2006.01)

(52) U.S. Cl.
CPC ................... *G02B 6/0031* (2013.01)

(58) Field of Classification Search
CPC .... G02B 6/0031; G02B 6/0088; G02B 6/005; G02B 6/0055; G02B 6/0018; G02B 6/006; G02B 6/0028; G02B 6/0073; G02B 6/0021; G02B 27/0172; G02B 6/002; G02B 6/0023; G02B 6/0035; G02B 27/0101; G02B 27/0176; G02B 6/0001; G02B 6/0041; G02B 6/0033; G02B 6/0081; G02B 5/0808; G02B 5/1885; G02B 6/00; G02B 6/0015; H01H 2219/062; H01H 2219/044; H01H 2219/06; H01H 2219/064; H01H 2219/036; H01H 2219/014; H01H 13/023; H01H 13/704; H01H 2223/0345; H01H 2219/054; H01H 2221/024; H01H 9/161; H01H 9/182; H01H 2205/004;
(Continued)

(56) References Cited

U.S. PATENT DOCUMENTS

2008/0198625 A1* 8/2008 Inoue ..................... H01H 13/83
362/617
2010/0148996 A1* 6/2010 Wang ..................... H01H 13/83
341/22

FOREIGN PATENT DOCUMENTS

| CN | 218209362 | 1/2023 |
| TW | 201737842 | 11/2017 |
| TW | 202144728 | 12/2021 |

OTHER PUBLICATIONS

Wikipedia, "Infinity mirror", retrieved from https://en.wikipedia.org/w/index.php?title=Infinity_mirror&oldid=1171577869, retrieved on Nov. 1, 2023, pp. 1-3.

* cited by examiner

*Primary Examiner* — Fatima N Farokhrooz
(74) *Attorney, Agent, or Firm* — JCIPRNET

(57) ABSTRACT

A key structure includes a light source and a light guiding assembly, a transparent cover, a semi-transparent and semi-reflective mirror, and a reflection mirror disposed above the light source. The light guiding assembly includes a center column and a platform surrounding the center column. A bottom surface of the center column faces the light source. The transparent cover is disposed on the light guiding assembly and covers the center column and the platform. An exterior side wall of the transparent cover has strip recesses surrounding the center column and the platform. The reflection mirror is disposed in the light guiding assembly. The reflection mirror and the semi-transparent and semi-reflective mirror face each other through the transparent cover. A part of light generated by the light source generates an infinity reflection between the strip recesses, the reflection mirror, and the semi-transparent and semi-reflective mirror after passing through the light guiding assembly.

15 Claims, 9 Drawing Sheets

(58) Field of Classification Search
CPC . H01H 2205/026; G06F 1/1662; H01L 33/58; H01L 29/78633; H01L 33/44; H01L 23/3192; H01L 33/42; H01L 27/14625; H01L 27/14629; H01L 27/153; G02F 1/133553; G02F 1/133512; G02F 1/133615; G02F 1/134336; G02F 1/136209; G02F 1/1336; G02F 1/133603; G02F 2203/02; G02F 1/133602; G02F 1/133608; G02F 2202/28

See application file for complete search history.

KEY STRUCTURE

CROSS-REFERENCE TO RELATED APPLICATION

This application claims the priority benefit of Taiwan application serial no. 112138162, filed on Oct. 4, 2023. The entirety of the above-mentioned patent application is hereby incorporated by reference herein and made a part of this specification.

BACKGROUND

Technical Field

The disclosure relates to a key structure.

Description of Related Art

Traditional light-emitting keys are mostly provided with multiple light-emitting units on the main circuit board to provide illumination light to the keys or penetrate transparent keys to provide different visual effects.

However, the light-emitting unit is a divergent light source, so for the light-emitting unit disposed at the bottom portion of the key structure, the illumination light emitted will also escape from the sides in addition to the structure body. If the key structure is required to have sufficient brightness, it is usually necessary to set up two or more light-emitting units. However, this method may easily expose the light-emitting unit, causing visual abruptness. Therefore, there is currently no technology that achieves both sufficient brightness and suitable appearance.

SUMMARY

The disclosure provides a key structure, which creates an infinity reflection using relevant components, thereby achieving both illumination brightness and visual aesthetics.

The key structure of the disclosure includes a light source and a light guiding assembly, a semi-transparent and semi-reflective mirror, and a reflection mirror disposed above the light source. The light guiding assembly has a center column and a platform, the platform surrounds the center column, and a bottom surface of the center column faces the light source. An exterior side wall of the transparent cover has multiple strip recesses, and each strip recess surrounds the center column and the platform. The semi-transparent and semi-reflective mirror is disposed on the transparent cover. The reflection mirror is disposed in the light guiding assembly. The reflection mirror and the semi-transparent and semi-reflective mirror face each other through the transparent cover. A part of a light generated by the light source generates an infinity reflection between the strip recesses, the reflection mirror, and the semi-transparent and semi-reflective mirror after passing through the light guiding assembly.

Based on the above, in the key structure, the light guiding assembly, the transparent cover, the semi-transparent and semi-reflective mirror, and the reflection mirror are disposed on the light source. The exterior side wall of the transparent cover has the strip recesses surrounding the reflection mirror and the central column and the platform of the light guiding assembly, and the reflection mirror faces the semi-transparent and semi-reflective mirror through the transparent cover, so that after the light generated by the light source passes through the light guiding assembly, a part of the light generates the infinity reflection between the strip recesses, the reflection mirror, and the semi-transparent and semi-reflective mirror, and the sense of infinity caused by the infinity reflection is further amplified by the strip recesses.

Accordingly, when the user visually inspects the key structure, the infinity reflection generated by the simple components can form an image of sufficient brightness. The image has the sense of infinity and also prevents the outline of the light source from being exposed to form a preferred visual effect.

DESCRIPTION OF THE EMBODIMENTS

Figure 1:
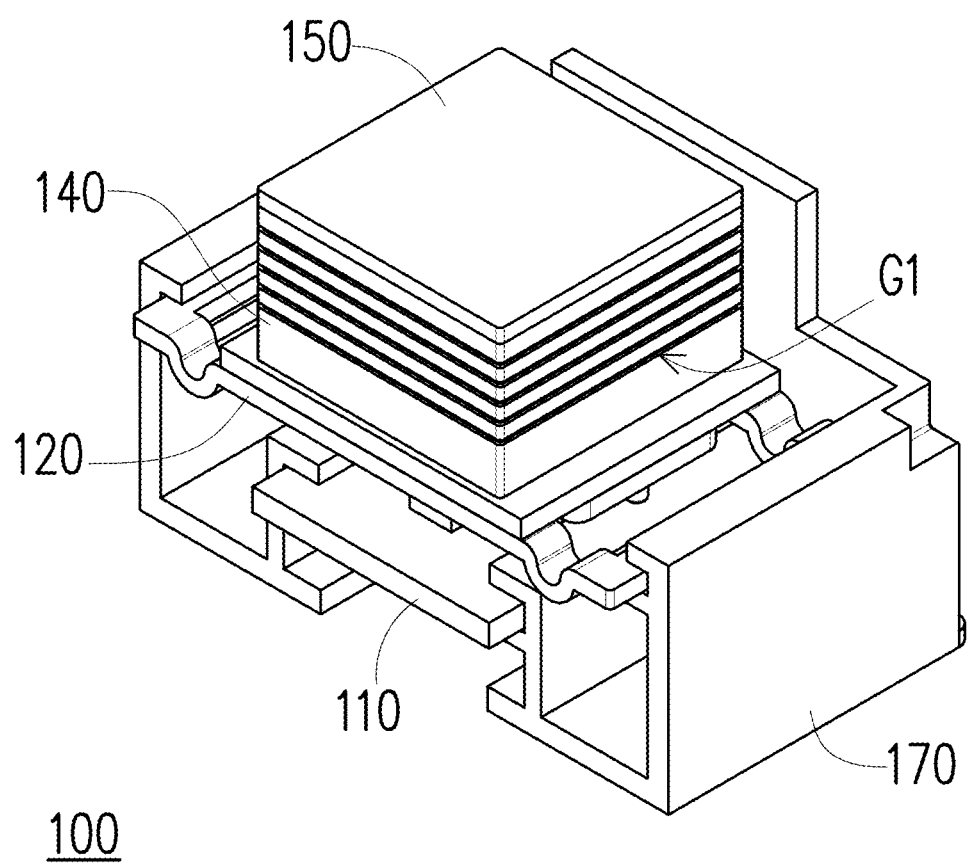
FIG. 1 is a schematic view of a key structure according to an embodiment of the disclosure.
Figure 2:
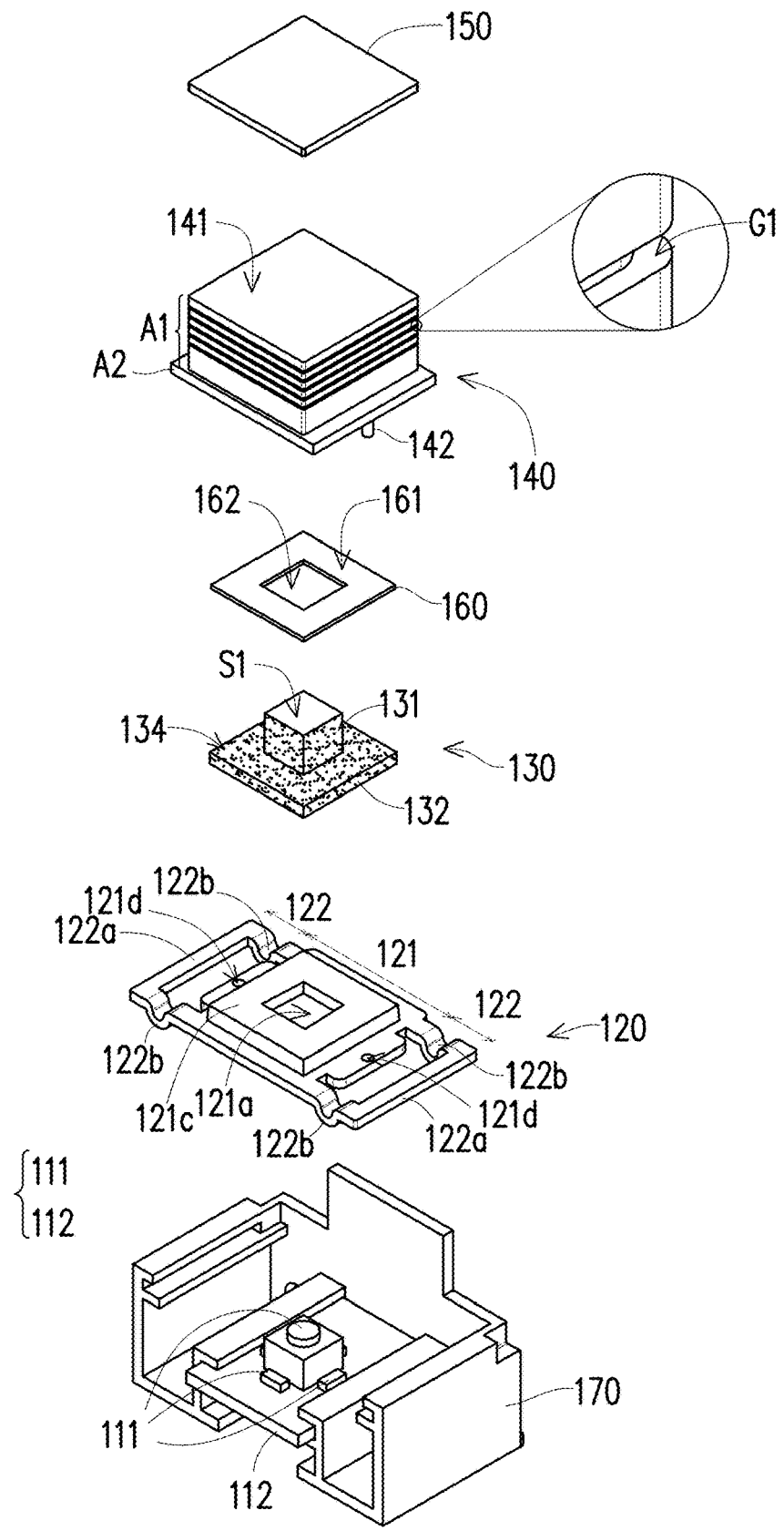
FIG. 2 is an exploded view of the key structure of FIG. 1.
Figure 3:
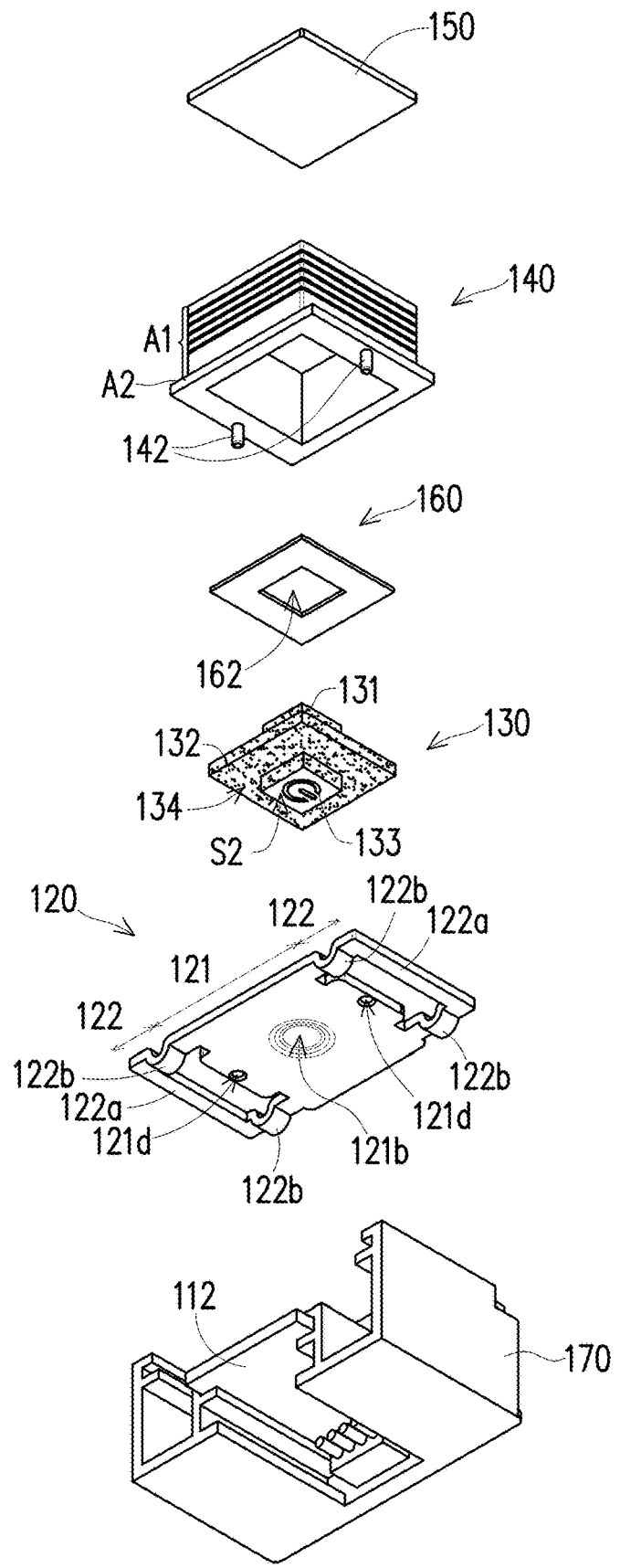
FIG. 3 is an exploded view of FIG. 2 from another perspective.

FIG. 1 is a schematic view of a key structure according to an embodiment of the disclosure. FIG. 2 is an exploded view of the key structure of FIG. 1. FIG. 3 is an exploded view of FIG. 2 from another perspective. Please refer to FIGS. 1 to 3 together. In this embodiment, a key structure 100 includes a light source module 110, a first light guiding member 120, a second light guiding member 130, a transparent cover 140, a semi-transparent and semi-reflective mirror 150, a reflection mirror 160, and a base 170. The light source module 110 includes a circuit board 112 and multiple light sources 111 (such as LEDs, but not limited thereto). The circuit board 112 is disposed on the base 170, and the light source 111 is disposed on the circuit board 112. After the light source module 110 is assembled, as shown in FIGS. 2 and 3, the first light guiding member 120, the reflection mirror 160 (which has a reflective surface 161 facing upward), the second light guiding member 130, the transparent cover 140, and the semi-transparent and semi-reflective mirror 150 are sequentially stacked.

As shown in FIGS. 2 and 3, the first light guiding member 120 of this embodiment is a light homogenizing and guiding plate, which is used to homogenize the light generated by the light source 111 below and then transmit the light upward (the top and bottom orientations of this embodiment are exemplified by FIG. 2, the semi-transparent and semi-reflective mirror 150 is at the top and the base 170 is at the bottom). Furthermore, the first light guiding member 120 has a base plate 121 and a pair of side wings 122 located on opposite sides of the base plate 121. A supporting portion 122a of the side wing 122 is connected to the base plate 121 through an elastic arm 122b. As shown in FIG. 1, the supporting portion 122a of the side wing 122 is assembled on the base 170, so that the base plate 121 is suspended above the light source 111. The elastic arm 122b provides an elastic force and a buffer required when the key structure 100 is pressed. The base plate 121 has a stage 121c and an accommodating recess 121a. The accommodating recess 121a is located in the center of the stage 121c.

The second light guiding member 130 is, for example, a transparent light guiding element, is disposed on the first light guiding member 120, and substantially leans on the stage 121c. The first light guiding member 120 includes a central column 131 and a platform 132. The platform 132 surrounds the central column 131, and the central column 131 is inserted into and stands in the accommodating recess 121a. As shown in FIG. 3, a bottom surface S2 of the center column 131 has a pattern 133, and the pattern 133 faces the base plate 121. At the same time, an area where the pattern 133 faces is substantially a corresponding place of a dome recess 121b at the bottom portion of the base plate 121. The reflection mirror 160 is disposed on the platform 132, and the central column 131 substantially passes through a central opening 162 of the reflection mirror 160, so that the reflection mirror 160 with a square frame shape is sleeved around and surround the central column 131. Here, a plane where the reflection mirror 160 is located is parallel to a plane where the semi-transparent and semi-reflective mirror 150 is located, and a strip recess G1 is located between the two planes.

In addition, the transparent cover 140 of this embodiment is disposed on the first light guiding member 120 and covers the central column 131 and the platform 132 of the second light guiding member 130. As shown in FIGS. 2 and 3, the base plate 121 of the first light guiding member 120 also has a positioning hole 121d for inserting a positioning column 142 of the transparent cover 140, so that the transparent cover 140 may be fixed on the first light guiding member 120. The transparent cover 140 includes a bottom portion A2 and a hollow column portion A1. The positioning column 142 extends and protrudes from the bottom portion A2 and faces away from the hollow column portion A1. The hollow column portion A1 of the transparent cover 140 further has the stripe recesses G1 on an exterior side wall thereof. Each stripe recess G1 surrounds the center column 131 and the platform 132 of the second light guiding member 130. The semi-transparent and semi-reflective mirror 150 is disposed on a top surface 141 of the transparent cover 140 and faces a top surface S1 of the central column 131 of the second light guiding member 130 through the top surface 141 of the transparent cover 140. At the same time, as shown in FIG. 2, the reflective surface 161 of the reflection mirror 160 also faces the semi-transparent and semi-reflective mirror 150 through the top surface 141 of the transparent cover 140.

In addition, in the second light guiding member 130 of this embodiment, a surface of the platform 132 and multiple side surfaces of the central column 131 adjacent to the platform 132 respectively have an opaque layer 134, which is, for example, by electroplating an opaque material onto the surface of the structure. Referring to both FIGS. 2 and 3, the top surface S1 of the center column 131 faces the bottom surface S2. The bottom surface S2 has the pattern 133 as mentioned above, and the top surface S1 faces the top surface 141 of the transparent cover 140 and the semi-transparent and semi-reflective mirror 150. Here, except for the top surface S1 and the bottom surface S2, the remaining surfaces of the center column 131 all have the opaque layer 134, which is marked with dots in the figure. This is precisely to smoothly transmit a part of the light projected from the light source 111 to the center column 131 from the bottom surface S2 to the top surface S1, so as to penetrate the key structure 100 via the top surface 141 of the transparent cover 140 and the semi-transparent and semi-reflective mirror 150. During the light transmission process, due to the presence of the opaque layer 134, the light passing through the center column 131 does not escape from the center column 131 in the middle, and an external light is blocked from entering the center column 131, thereby ensuring that an image formed by the pattern 133 of the bottom surface S2 may smoothly and clearly pass through the semi-transparent and semi-reflective mirror 150 for viewing. On the other hand, because there is the pattern 133 on the bottom surface S2 of the center column 131, and the image of the pattern 133 is used as a mark of the key structure 100 (for the user to view), through the disposition of the center column 131 and the opaque layer 134, the image of the pattern 133 is ensured to be seen.

Figure 4:
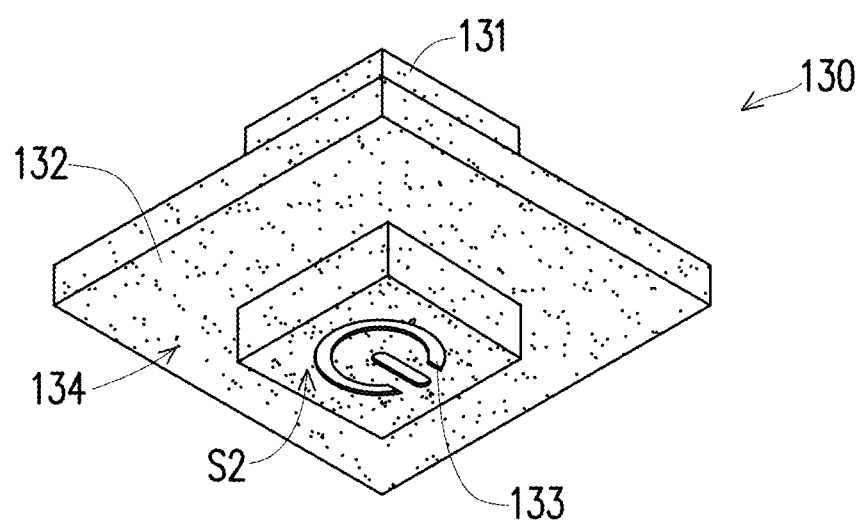
FIG. 4 is a schematic view of a light guiding member according to another embodiment of the disclosure.

FIG. 4 is a schematic view of a light guiding member according to another embodiment of the disclosure. Please refer to FIG. 4. Different from FIGS. 2 and 3 in which except for the top surface S1 and the bottom surface S2 of the center column 131, the remaining surfaces of the second light guiding member 130 are all electroplated with the opaque layer 134, the embodiment shown in FIG. 4 shows that there is also the opaque layer 134 on the bottom surface S2 of the center column 131, and only the area occupied by the pattern 133 does not have the opaque layer 134 to facilitate the passage of light. Simply put, the pattern 133 shown in FIG. 4 is equivalent to electroplating the opaque layer 134 on the entire bottom surface S2, and then removing a part of the opaque layer 134 to form an area for light to pass through the pattern 133.

Figure 5A:
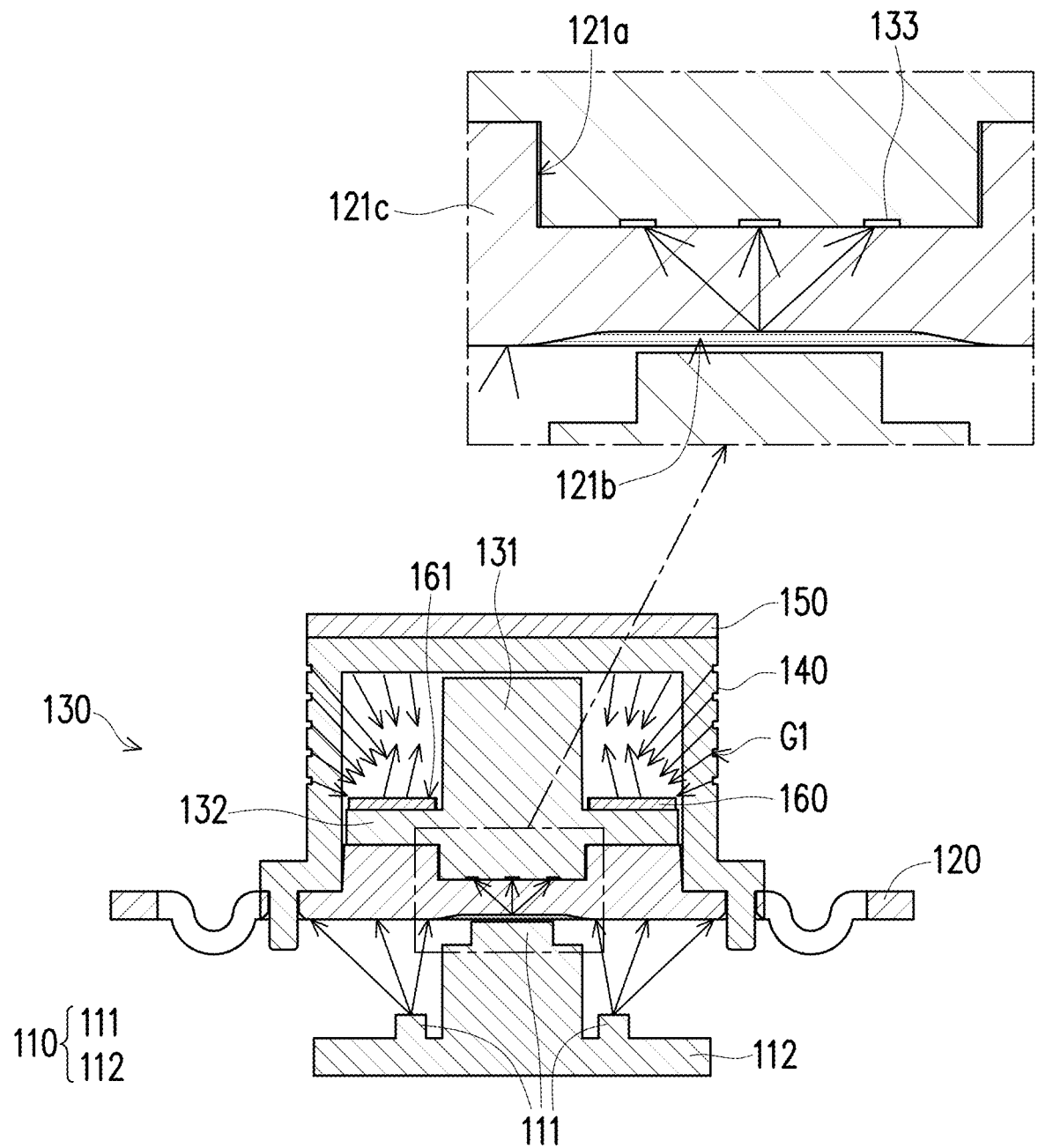
FIG. 5A is a cross-sectional view of the key structure of FIG. 1.

FIG. 5A is a cross-sectional view of the key structure of FIG. 1. Please refer to FIG. 2, FIG. 3, and FIG. 5A together. As shown in the above component configuration, an arrow representing the light shown in FIG. 5A is as shown. A part of the light generated from the light source 111 is transmitted into the central column 131 via the base plate 121 of the first light guiding member 120, and in particular via the dome recess 121b. Then, as mentioned above, due to the presence of the opaque layer 134, the light entering the central column 131 is continuously transmitted upward until passing through the transparent cover 140 and the semi-transparent and semi-reflective mirror 150, so that the image formed by the pattern 133 can be seen smoothly. The remaining light is transmitted into the space covered and formed by the transparent cover 140 sequentially via the platform 132 of the first light guiding member 120 and the second light guiding member 130. Next, as shown in FIG. 5A, due to the presence of the strip recess G1, a part of the light projected to the strip recess G1 is further projected to the reflective surface 161 of the reflection mirror 160 and then transmitted out of the key structure 100 via the transparent cover 140 and the semi-transparent and semi-reflective mirror 150. More importantly, since the reflection mirror 160 and the semi-transparent and semi-reflective mirror 150 are disposed as shown in FIG. 5A, there is an infinity reflection effect of continuous reflection of light between the two. At the same time, with the strip recess G1, the user can obviously see the image of the strip recess G1 increasing exponentially. On the other hand, because the second light guiding member 130 has the opaque layer 134, the light inside and outside the center column 131 may not interfere with each other. That is, the light causing the infinity reflection may smoothly be reflected around the center column 131, and the light in the central column 131 may also be independent from the surroundings and transmitted inside the central column 131. Since the plane where the reflection mirror 160 of this embodiment is located is parallel to the plane where the semi-transparent and semi-reflective mirror 150 is located, and the strip recess G1 is located between the two planes, the infinity reflection effect is smoothly generated.

Figure 5B:
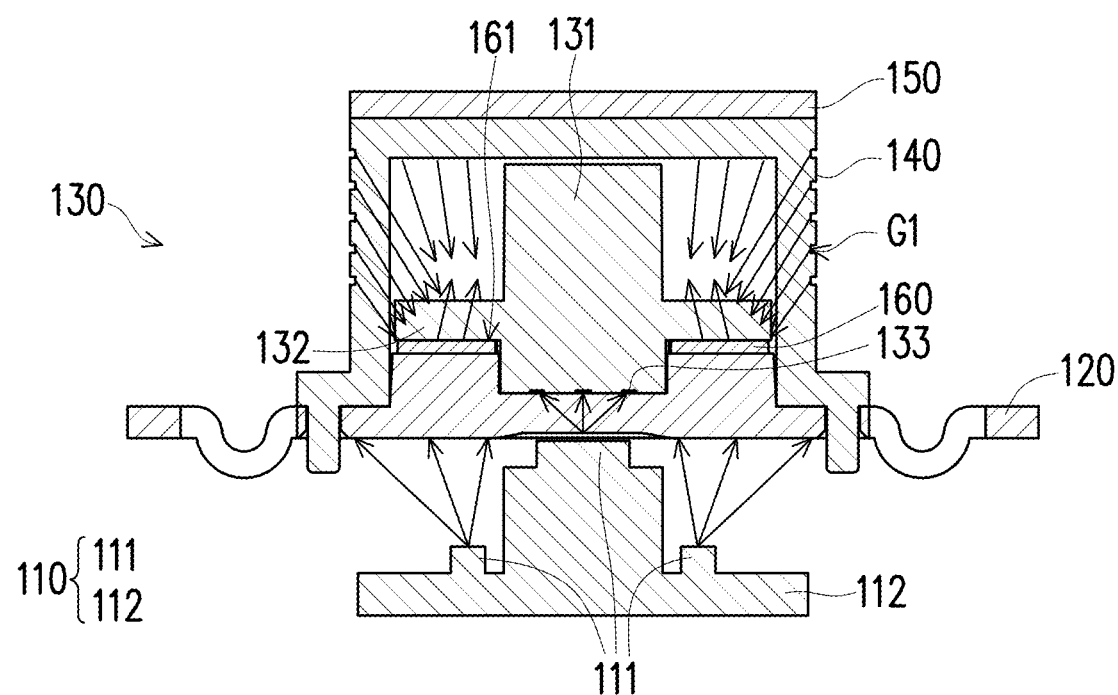
FIG. 5B is a cross-sectional view of a key structure according to another embodiment of the disclosure.

FIG. 5B is a cross-sectional view of a key structure according to another embodiment of the disclosure. Please refer to FIG. 5B and compare with FIG. 5A. Different from FIG. 2, FIG. 3, or FIG. 5A in which the reflection mirror 160 is sleeved on the central column 131 of the second light guiding member 130 and stacked on the platform 132, the reflection mirror 160 of this embodiment is disposed between the stage 121c of the first light guiding member 120 and the platform 132 of the second light guiding member 130, and the reflection mirror 160 is also sleeved on the central column 131. The only difference is that the reflection mirror 160 is disposed on a lower part of the central column 131. As mentioned above, the second light guiding member 130 is the transparent light guiding element. Therefore, the platform 132 of the second light guiding member 130 of this embodiment does not need to be electroplated with the opaque layer 134 to facilitate the light projected to the reflective surface 161 or reflected from the reflective surface 161 to pass through the platform 132. However, the center column 131 of this embodiment still needs to be electroplated with the opaque layer 134 as in the previous embodiment.

Figure 6A:
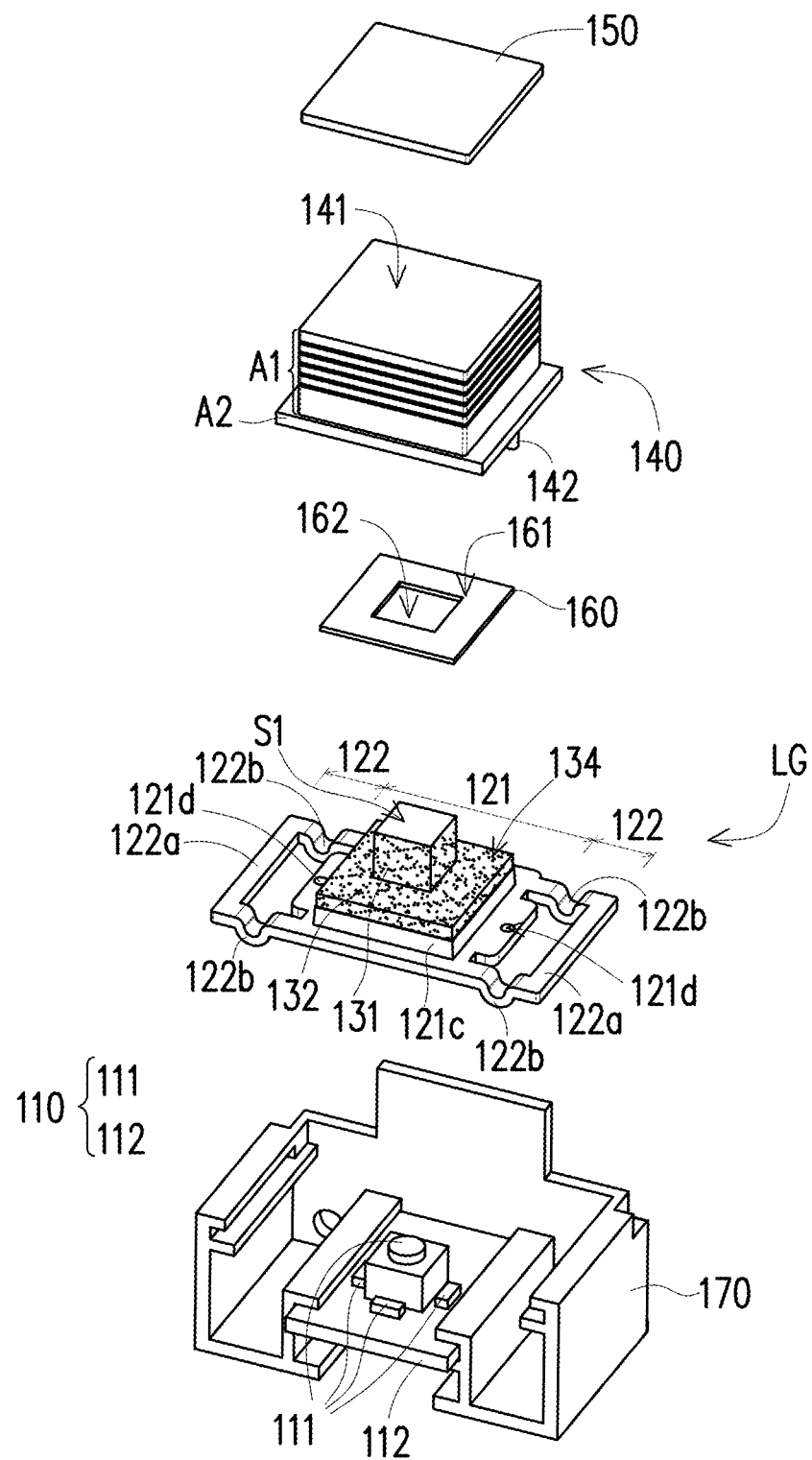
FIGS. 6A and 6B respectively illustrate an exploded view of a key structure according to another embodiment of the disclosure at different viewing angles.
Figure 6B:
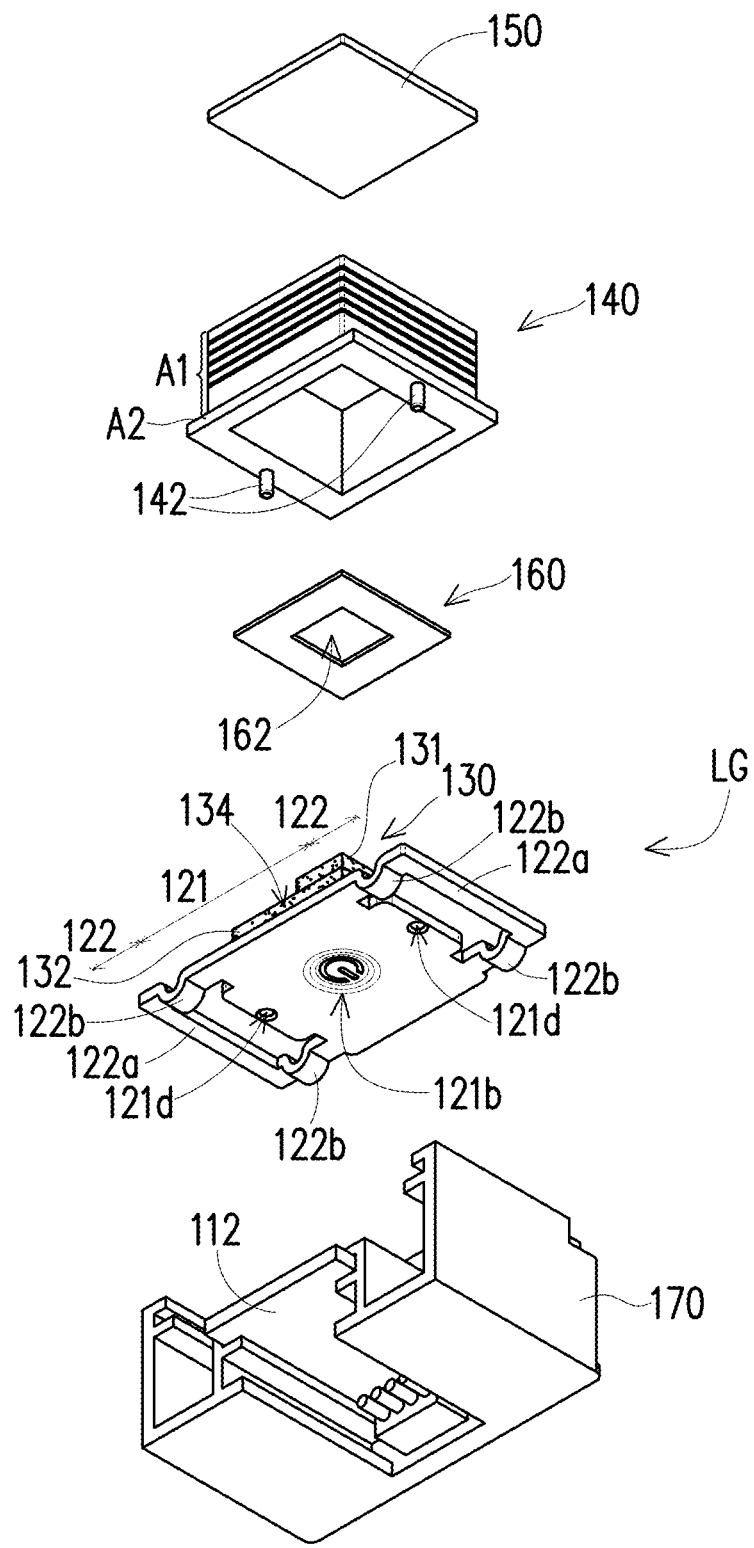

FIGS. 6A and 6B respectively illustrate an exploded view of a key structure according to another embodiment of the disclosure at different viewing angles. Please refer to both FIG. 6A and FIG. 6B. Different from the separate disposition of the first light guiding member 120 and the second light guiding member 130, this embodiment substantially combines the two into one to form an integrated structure. That is, the two are formed into a single light guiding assembly LG using existing technology. The detailed structure is still as shown in the previous embodiment, but the difference is that the pattern 133 originally disposed on the central column 131 may be changed to be disposed on the dome recess 121b.

Figure 7:
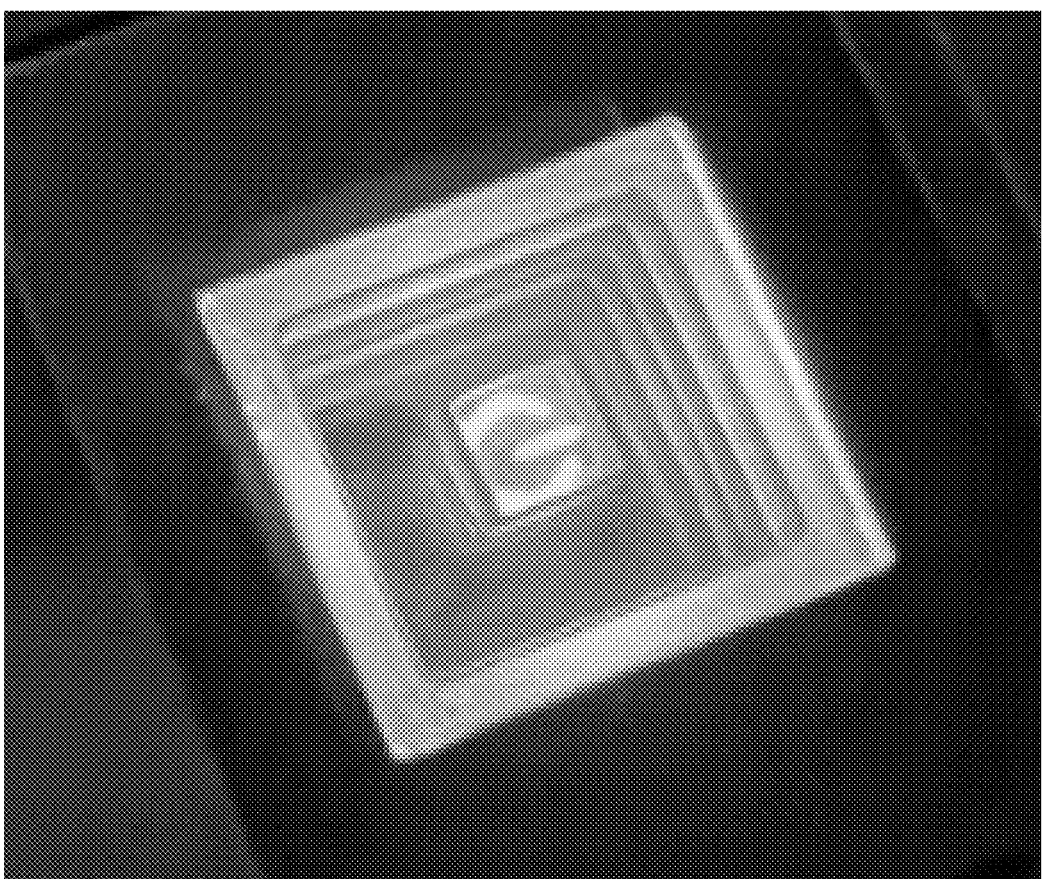
FIG. 7 is a schematic view of the key structure in a light-emitting state.

FIG. 7 is a schematic view of the key structure in a light-emitting state. Please refer to FIG. 7 and compare with the previous embodiment to summarize the component configuration. Through disposing the reflection mirror 160 inside the transparent cover 140 and the semi-transparent and semi-reflective mirror 150 outside the transparent cover 140, the key structure 100 smoothly generate the infinity reflection between the two by the light generated form the light source 111. More importantly, there are the strip recesses G1 on the exterior side wall of the transparent cover 140, so that the visual effect of infinite stripes can be formed in conjunction with the infinity reflection effect. At the same time, since the opaque layer 134 is disposed on a part of the surface of the central column 131 or the second light guiding member 130, the light inside and outside the central column 131 is maintained without interfering with each other, so that the required visual effects can be presented respectively.

To sum up, in the key structure of the embodiments of the disclosure, the light guiding assembly, the transparent cover, the semi-transparent and semi-reflective mirror, and the reflection mirror are disposed on the light source. The exterior side wall of the transparent cover has the strip recesses surrounding the reflection mirror and the central column and the platform of the light guiding assembly, and the reflection mirror faces the semi-transparent and semi-reflective mirror through the transparent cover, so that after the light generated by the light source passes through the light guiding assembly, a part of the light generates the infinity reflection between the strip recesses, the reflection mirror, and the semi-transparent and semi-reflective mirror, and the sense of infinity caused by the infinity reflection is further amplified by the strip recesses.

Accordingly, when the user visually inspects the key structure, the infinity reflection generated by the simple components can form an image of sufficient brightness. The image has the sense of infinity and also prevents the outline of the light source from being exposed to form a preferred visual effect.

What is claimed is:

1. A key structure, comprising:
   a light source;
   a light guiding assembly, disposed above the light source, wherein the light guiding assembly has a central column and a platform, the platform surrounds the central column, and a bottom surface of the central column faces the light source;
   a transparent cover, disposed on the light guiding assembly and covering the central column and the platform, wherein an exterior side wall of the transparent cover has a plurality of strip recesses, and each of the strip recesses surrounds the central column and the platform;
   a semi-transparent and semi-reflective mirror, disposed on the transparent cover; and
   a reflection mirror, disposed on the light guiding assembly, wherein the reflection mirror and the semi-transparent and semi-reflective mirror face each other through the transparent cover, and a part of a light generated by the light source generates an infinity reflection between the strip recesses, the reflection mirror, and the semi-transparent and semi-reflective mirror after passing through the light guiding assembly.

2. The key structure according to claim 1, wherein the reflection mirror is located on the platform and surrounds the central column.

3. The key structure according to claim 1, wherein a plane where the reflection mirror is located is parallel to a plane where the semi-transparent and semi-reflective mirror is located, and the strip recesses are located between the two planes.

4. The key structure according to claim 1, wherein a surface of the platform and a plurality of side surfaces of the central column adjacent to the platform respectively have an opaque layer.

5. The key structure according to claim 1, wherein the central column further has a top surface opposite to the bottom surface and facing the semi-transparent and semi-reflective mirror, and remaining surfaces of the central column except the top surface and the bottom surface have an opaque layer.

6. The key structure according to claim 1, wherein the central column has a pattern and a top surface, the top surface is opposite to the bottom surface and faces the semi-transparent and semi-reflective mirror, the pattern is located on the bottom surface, and remaining surfaces of the central column except the top surface and the pattern have an opaque layer.

7. The key structure according to claim 1, wherein the light guiding assembly comprises a first light guiding member and a second light guiding member, the first light guiding member is located above the light source, the second light guiding member is located on the first light guiding member, and the second light guiding member has the central column and the platform.

8. The key structure according to claim 6, wherein the pattern is formed by removing the opaque layer from the bottom surface.

9. The key structure according to claim 7, wherein the first light guiding member has a base plate and a pair of side wings, and the pair of side wings are connected to opposite sides of the base plate.

10. The key structure according to claim 7, wherein the second light guiding member is a transparent member, and the reflection mirror is located between the platform and the first light guiding member and surrounds the central column.

11. The key structure according to claim 9, further comprising a base, wherein the light source is disposed on the base, and the base plate is suspended above the light source through the pair of side wings being disposed on the base.

12. The key structure according to claim 9, wherein each of the side wings has an elastic arm connected to the base plate.

13. The key structure according to claim 9, wherein the base plate has a stage and an accommodating recess, the accommodating recess is located on the stage, the center column stands in the accommodating recess, and the platform leans on the stage.

14. The key structure according to claim 9, wherein the base plate further has a dome recess facing the light source.

15. The key structure according to claim 9, wherein the transparent cover is assembled on the base plate to cover the platform.

* * * * *